United States Patent
Rose

(10) Patent No.: US 12,319,194 B2
(45) Date of Patent: Jun. 3, 2025

(54) CARGO HOLD SYSTEM FOR MOTOR VEHICLES

(71) Applicant: Lund, Inc., Ann Arbor, MI (US)

(72) Inventor: Brent Lorenz Rose, Jefferson, GA (US)

(73) Assignee: Lund, Inc., Ann Arbor, MI (US)

( * ) Notice: Subject to any disclaimer, the term of this patent is extended or adjusted under 35 U.S.C. 154(b) by 583 days.

(21) Appl. No.: 17/550,304

(22) Filed: Dec. 14, 2021

(65) Prior Publication Data
US 2022/0219594 A1 Jul. 14, 2022

Related U.S. Application Data

(60) Provisional application No. 63/137,187, filed on Jan. 14, 2021.

(51) Int. Cl.
*B60P 7/08* (2006.01)

(52) U.S. Cl.
CPC .................. *B60P 7/0807* (2013.01)

(58) Field of Classification Search
CPC ................ B60P 7/0807; B60R 7/02
See application file for complete search history.

(56) References Cited

U.S. PATENT DOCUMENTS

| | | | |
|---|---|---|---|
| 4,718,584 A | 1/1988 | Schoeny | |
| 4,842,460 A | 6/1989 | Schlesch | |
| 5,392,972 A | 2/1995 | Caruso et al. | |
| 5,518,170 A | 5/1996 | Rasmussen | |
| 6,027,104 A * | 2/2000 | Alexander | F16C 11/04 256/25 |
| 6,244,802 B1 | 6/2001 | Stanesic et al. | |
| 6,609,744 B2 | 8/2003 | Gehring et al. | |

FOREIGN PATENT DOCUMENTS

EP 2184204 A1 5/2010

* cited by examiner

*Primary Examiner* — Corey N Skurdal

(57) ABSTRACT

A retention member, cargo hold system, and method for securing articles while being transported in a vehicle. The cargo hold system comprises a retention member and a floor mat. The retention member comprises at least a first and second leg, pin, and spring. Each of the first and second legs include at least one knuckle aligned coaxially with a rotational axis of the retention member. The pin is linearly translatable along the rotational axis. The spring biases the pin in a first direction and upon biasing the pin in a second direction, the at least two legs are enabled to rotate relative to each other.

16 Claims, 6 Drawing Sheets

CARGO HOLD SYSTEM FOR MOTOR VEHICLES

FIELD

The present teachings generally relate to a retention member, cargo hold system, and method for securing articles in a vehicle.

BACKGROUND

Motor vehicles are used frequently to transport cargo. Cargo ("articles"), such as groceries, are typically bagged and placed inside the vehicle on a seat or floor area of a passenger compartment, or a cargo area. Other cargo, such as potted plants, are more likely to be put into a cargo area.

Most drivers are aware that some types of cargo can slide, roll, or fall over during transport. Grocery bags in particular represent a widely experienced problem. They tend to fall over and spill their contents when the vehicle turns a corner, even at slow speeds, and certainly upon sudden stops. The problem is lessened in vehicles that have deep back seat floor wells. Vehicles with a wide flat floor or cargo area present a greater challenge due to the large open spaces therein, unbounded by intervening structures such as seats.

In order to address at least some of the problems discussed above, some drivers purchase products such as those described in U.S. Pat. No. 6,244,802 B1 and EP 2 184 204 A1, incorporated herein by reference in their entirety for all purposes. However, such articles are limited in their configurations so that cargo of certain shapes or sizes are not properly secured.

It would be desirable to provide a retention member that has a modular configuration to accommodate cargo of different shapes and sizes. It would be desirable to provide a retention member that can change configuration quickly and simply so frequent or even daily use of the retention member is not impeded by complexity of use. It would be desirable to provide a retention member that can be easily secured to and removed from a floor mat.

SUMMARY

The present disclosure relates to a retention member, which may address at least some of the needs identified above. The retention member may comprise at least a first and second leg. Each of the at least first and second leg may include at least one knuckle aligned coaxially with a rotational axis of the retention member. The retention member may comprise a pin linearly translatable along the rotational axis. The retention member may comprise a spring biasing the pin in a first direction. Translating the pin in a second direction may enable the at least two legs to rotate relative to each other.

The present disclosure relates to a cargo hold system, which may address at least some of the needs identified above. The cargo hold system may comprise a retention member. The retention member may include at least a first and second leg. Each of the first and second leg may include at least one knuckle aligned coaxially with a rotational axis of the retention member. The retention member may include a pin linearly translatable along the rotational axis. The retention member may include a spring biasing the pin in a first direction. The cargo hold system may comprise a floor mat. The retention member may removably fasten to the floor mat.

The present disclosure relates to a method, which may address at least some of the needs identified above. The method may comprise providing a retention member including at least a first and second leg joined along a rotational axis. The method may comprise depressing a pin linearly along the rotational axis in a first direction. The method may comprise positioning the at least first and second leg in an angular position relative to each other. The method may comprise releasing the pin to enable the pin to translate along the rotational axis in a second direction.

DETAILED DESCRIPTION

Figure 1:
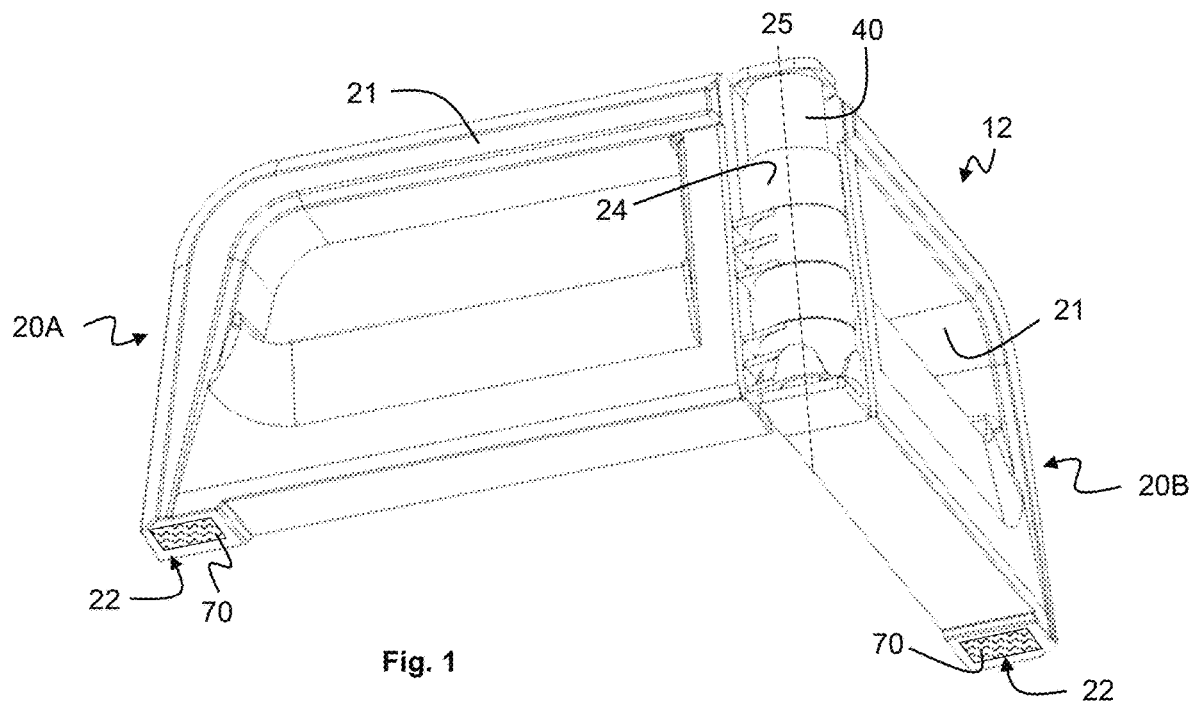
FIG. 1 is a perspective view of a retention member.

The present teachings meet one or more of the above needs by the improved retention member, cargo hold system, and method described herein.

The present disclosure provides for a cargo hold system. The cargo hold system may function to secure articles. The cargo hold system may comprise one or more retention members and a floor mat. The one or more retention members may be fastened to or removed from the floor mat by the method described herein.

The cargo hold system may be employed in a vehicle. The cargo hold system may be employed in a cargo area and/or passenger area of a vehicle. The vehicle may include a sedan, station wagon, hatchback, crossover, SUV, van, pickup truck, utility vehicle, flatbed truck, trailer, flatbed trailer, the like, or any combination thereof.

The cargo hold system may secure articles while the articles are being transported or while the vehicle is stationary. The cargo hold system may ensure articles remain upright, or at least generally in a position they were originally placed in by a user. The cargo hold system may prevent movement of articles within a vehicle.

The cargo hold system may at least partially surround one or more articles. The cargo hold system may interface with one or more sides of an article, opposing sides, opposing corners, or any combination thereof. The cargo hold system may act as a barrier between and/or around articles.

The cargo hold system may include one or more floor mats, retention members, or both. One or more retention members may be positioned strategically on a floor mat. The positioning of the retention members may be determined by a size and/or shape of an article or a plurality of articles placed next to each other. The retention members may be removable from and/or repositionable on a floor mat. The retention members may be positioned on a floor mat before and/or after articles are introduced into a vehicle. The retention members and floor mat may have a modular functionality.

The cargo hold system may be employed to secure one or more articles. The articles may include luggage, groceries, boxes, tools, construction materials, gardening supplies, sports equipment, clothing, shoes, foods, beverage, other personal and/or occupational property, the like, or any combination thereof. The articles may be prone to sliding, rolling, falling over, the like, or any combination thereof while a vehicle is in motion. The articles may be surrounded by and/or in contact with a cargo hold system to prevent sliding, rolling, falling over, the like, or any combination thereof.

The cargo hold system may include one or more floor mats. The floor mat may function to provide a mounting surface for one or more retention members. The floor mat may support one or more articles, retention members, or both thereon.

The floor mat may be integrated into the vehicle floor or carpet. The floor mat may be an ancillary component placed onto or attached to the vehicle floor or carpet. The floor mat may have one or more generally planar portions, raised portions, depressed portions, sidewalls, or any combination thereof. The generally planar portion may lay generally flat on a generally flat surface of a cargo area. The raised portions and/or depressed portions may contour features of the cargo area. For example, the floor mat may include raised portions contouring the rear wheel wells expressed in the cargo area. The sidewalls may curve and/or bend away from a floor of a vehicle. The sidewalls may extend at least partially around a perimeter of the floor mat.

The floor mat may be located in a passenger area, a cargo area, a trunk, a trailer, a truck bed, a camper, or a combination thereof. The floor mat may also be used in non-vehicular applications to store or secure articles. For example, the floor mat may find use in kitchens (i.e., kitchen drawers, shelves, pantries), toolboxes, garages, basements, entertainment centers, closets, the like, or any combination thereof.

The floor mat may include one or more floor mat fasteners. The floor mat fastener may include a hook-and-loop-type fastener, magnets, snaps, pegs and holes, the like, or any combination thereof. It may be particularly advantageous for the floor mat to include a loop-type fastener ("fiber loops") because the texture and feel thereof may be adapted to mimic OEM vehicle carpeting. A loop-type fastener, relative to a hook-type fastener, may be generally less abrasive against articles supported thereon. A hook-and-loop-type fastener may provide more positional options for mounting one or more retention members.

The cargo hold system may include one or more retention members. The retention member may function to prevent articles from sliding, rolling, falling over, the like, or any combination thereof. The retention member may be fastened to and/or supported by a floor mat. The retention member may stand generally orthogonal to a floor mat, but in some configurations may be set at any angle relative to the floor mat.

The retention member may at least partially surround one or more articles. One retention member may be used in conjunction with a sidewall of a floor mat, an interior wall of a vehicle, a seat of a vehicle, or any combination thereof to retain one or more articles therebetween. Two retention members may be positioned on a floor mat diametrically opposite one another to form a multi-sided barrier to retain one or more articles. Three or more retention members may be positioned on a floor mat to create a multi-sided barrier to retain one or more articles. One or more retention members can be used independently, in pairs, groups, or any combination thereof. Two or more retention members may be arranged in various geometric patterns to form a barrier configuration to retain various articles having various shapes, sizes, or both.

The retention member may include one or more legs, handles, floor mat engaging surfaces, knuckles, spring engagement members, pin key members, pins, caps, springs, or any combination thereof.

The one or more retention members may comprise one or more legs. The legs may function as a barrier around one or more articles. The legs may stand generally upright on a floor mat. At least one edge of a leg may contact a floor mat. At least one side of a leg may contact a floor mat.

The legs may be generally rectangular members, square members, triangular members, round, circular, the like, or any combination thereof. Each of the legs may be generally planar, but rounded, curved, and/or angled legs can be envisioned by the present teachings.

The legs may include two or more edges. At least one edge may support the retention member on a floor mat. The edges may be curved, straight, acutely angled, or any combination thereof. The legs may include two opposing sides. The sides may extend between two or more edges of the legs. The sides may extend generally orthogonal to a floor mat, at an acute angle to a floor mat, or both. The legs may have a hollow and/or solid construction. The legs may include one or more voids extending between or through opposing sides of the legs.

The legs may have a height of about 2 cm or more, about 4 cm or more, about 6 cm or more, about 8 cm or more, or even about 10 cm or more. The legs may have a height of about 20 cm or less, about 18 cm or less, about 14 cm or less, or even about 12 cm or less. The height may be measured in a direction extending generally vertically from a floor mat, from an edge interfacing with the floor mat. The legs may have a length of about 2 cm or more, about 4 cm or more, about 6 cm or more, about 8 cm or more, or even about 10 cm or more. The legs may have a length of about 20 cm or less, about 18 cm or less, about 14 cm or less, or even about 12 cm or less. The length may be measured in a direction extending generally parallel to a floor mat as between two edges not interfacing with the floor mat.

The legs may be fabricated from polymer, metal, wood, or any combination thereof. The polymer may include polyethylene ("PE"), polypropylene ("PP"), polyvinylchloride ("PVC"), polyamide ("PA"), polycarbonate ("PC"), Polymethylmethacrylate ("PMMA"), the like, or any combination thereof. The metal may include aluminum, magnesium, zinc, tin, brass, iron, steel, titanium, the like, or any combination thereof.

Two or more legs may be angularly positioned relative to each other. Two or more legs may be coupled together by a hinged or pivot engagement along one or more edges. The legs may be selectively configured as planar or acutely angled relative to each other. The angle between the legs may be any angle. The angle may be about 30° or more, about 60° or more, about 90° or more, about 120° or more, about 150° or more, or even about 180° or more. The angle may be about 330° or less, about 300° or less, about 270° or less, about 240° or less, or even about 210° or less.

The legs may be rotatably or pivotably coupled together. The legs may be rotatably coupled together by one or more knuckles, pins, or both. The one or more knuckles and pins may cooperate with each other to act as a hinge. Two or more legs may be coupled together by a hinged engagement along one or more edges. Two legs may be rotatably coupled together along an edge of each leg. One leg may be rotatably coupled to two or more other legs along two or more separate edges of the one leg. For example, each of two opposing edges of a leg may be coupled to another leg. One leg may be rotatably coupled to two or more other legs along a single edge of the one leg. The legs may rotate relative to each other about a rotational axis. A center of one or more knuckles, pins, or both may be coaxial with the rotational axis. One or more legs may rotate relative to a pin while one or more other legs may be rotatably static relative to the pin.

The legs may include one or more handles, floor mat engaging surfaces, knuckles, spring engagement members, spring retaining members, pin key members, knuckle indexing members, or any combination thereof.

The one or more retention members may comprise one or more handles. The handle may function to assist users grip and/or manipulate legs of a retention member. The handle may be integrally formed on and/or affixed to a leg. An integrally formed handle may by formed into the structure of a leg. For example, a void may extend through opposing sides of a leg allowing fingers to wrap around and grip an edge of the leg. A handle may be fastened to an edge of a leg.

The handle may be located on any edge and/or side of a leg. It may be particularly advantageous for the handle to be located proximal to an edge of a leg opposing a floor mat so it is readily accessible to a user and so the retention member can be lifted generally vertically from a floor mat.

The one or more retention members may comprise one or more floor mat engaging surfaces. The floor mat engaging surface may function to support a retention member on a floor mat, fasten a retention member to a floor mat, or both.

The floor mat engaging surface may include an edge of a retention member or at least a portion thereof. The floor mat engaging surface may include one or more raised surfaces projecting from an edge of a leg. The floor mat engaging surface may be located on an edge of a retention member, which interfaces with a floor mat. The floor mat engaging surface may include one or more retention member fasteners. The retention member fastener may include a hook-and-loop-type fastener, magnets, snaps, pegs, and holes, the like, or any combination thereof. The retention member fastener may at least partially cover a surface area of a floor mat engaging surface.

The one or more retention members may comprise one or more knuckles. The knuckles may function to couple two or more legs together; enable rotation or pivoting of one or more legs relative to each other, relative to one or more articles, relative to the floor mat and/or vehicle, or a combination thereof; or both. The knuckles may be generally tubular. The knuckles may be open-ended at one or both ends. The knuckles may include an inner diameter and an outer diameter.

The knuckles may comprise a wall, defined by the inner diameter and the outer diameter, extending around a circumference of the knuckles, or at least a portion thereof. The wall may extend about 180° or more, about 210° or more, or even about 240° or more around a circumference of the knuckles. The wall may extend about 330° or less, about 300° or less, or even about 270° or less around a circumference of the knuckles. Walls that extend less than the entire circumference of the tube may include two ends and a gap therebetween. The two ends may be coupled to an edge of a leg or the gap may be exposed at some point on the circumference of the tube. The gap may provide for a snap-fit between the knuckles and a pin. A longitudinal axis of the knuckle, extending through opposing ends of the tubular form, may be generally parallel to an edge of a leg.

The knuckles may be fabricated from the same or different material as a leg. The knuckle may be fabricated from polymer, metal, wood, or any combination thereof. The polymer may include polyethylene ("PE"), polypropylene ("PP"), polyvinylchloride ("PVC"), polyamide ("PA"), polycarbonate ("PC"), Polymethylmethacrylate ("PMMA"), the like, or any combination thereof. The metal may include aluminum, magnesium, zinc, tin, brass, iron, steel, titanium, the like, or any combination thereof.

The knuckles may be integrally formed on and/or fastened to a leg. For example, the knuckle may be integrally formed on a leg by injection molding the two components as a single piece. The knuckle may be located on or proximate to one or more edges of a leg. The knuckles may be located on or proximate to opposing edges of a leg. One or more ribs or other suitable structural features may extend between a leg and knuckle to strengthen the engagement thereof.

Two or more knuckles may be coupled to a leg with a space between the knuckles. Knuckles of two or more legs may be staggered so that a knuckle of one leg fits within a space between two knuckles of another leg. Knuckles of a leg may fit flush with two knuckles of another leg. In this aspect, a pin may move relative to the knuckles of both legs. Knuckles of a leg may fit with a space between one or more adjacent knuckles of another leg. In this aspect, a pin may be fixed to at least one knuckle of one leg and move relative to one or more knuckles of at least another leg. The knuckles of two or more legs may be arranged so that when the legs are coupled, the upper edges and/or the lower edges of both legs align. The lower edge may be an edge adapted to interface with a floor mat and the upper edge may oppose the lower edge.

A single leg may include one or more, two or more, three or more, or even four or more knuckles. A single leg may include ten or less, nine or less, eight or less, or even seven or less knuckles. When the legs are coupled, a central longitudinal axis of the knuckles may be coaxial with each other and/or a rotational axis of a retention member.

The knuckles may include one or more spring engagement members, spring retaining members, pin key members, knuckle indexing members, or any combination thereof.

The one or more legs and/or knuckles may comprise one or more spring engagement members. The spring engagement member may function to support a spring, load a spring, or both. The spring engagement member may include a platform extending radially toward a center of a knuckle.

The spring engagement member may extend cantilever from a knuckle and/or leg. A surface of the spring engagement member, upon which a spring is adapted to rest, may be generally orthogonal to a rotational axis of a retention member. A surface area of the platform, viewed along a longitudinal axis of a knuckle, may be generally equal to or greater than a circumference of the spring. A space may be located between the platform and inner circumference of a knuckle, the space being adapted to accommodate a wall of a pin therebetween.

The spring engagement member may include a bridge connecting the platform with a leg and/or knuckle. The bridge may extend through a slot formed in a pin. A surface area of the platform, viewed along a longitudinal axis of a knuckle, may be greater than a surface area of the bridge.

A bracket or other suitable support structure may extend between the spring engagement member and a leg and/or knuckle to counteract bending stress. The bending stress may be applied to the spring engagement member when a spring resting on the same is placed under a load.

The one or more spring retaining members, caps, or both may comprise one or more spring retaining members. The spring retaining member may function to prevent or at least reduce the likelihood of shifting or buckling of a spring, couple a spring to a cap and/or spring engagement member, or both.

In one aspect, the spring retaining member may accommodate a compression spring. When accommodating a compression spring, the spring retaining member may include a projection, depression, or both. The projection may extend generally orthogonal to a spring engagement member, a cap or both. The depression may be formed into a spring engagement member, a cap, or both. It may be particularly advantageous for the projection and/or depression to be generally tubular or cylindrical in order to conform with the geometry of a spring. The spring retaining member may fit around an outer circumference of a spring, an inner circumference of a spring, or both. The spring and spring retaining member may be friction-fit or have a spacing therebetween.

In another aspect, the spring retaining member may accommodate an extension spring. When accommodating an extension spring, the spring retaining member may include a bar formed onto a spring engagement member. A hook on an extension spring may engage with the bar. A center of the spring retaining member may be coaxial with a rotational axis of a retention member. A center of the spring retaining member on a spring engagement member may be coaxial with a center of a spring retaining member on a cap. It may be appreciated that the retaining member may be free of spring retaining members. For example, when a barrel spring is employed, the chances of shifting or buckling of the spring may be greatly reduced.

The one or more retention members may comprise one or more pin key members. The pin key member may function to prevent pin rotation relative to a leg, guide a pin's movement, or both. The pin key member may include one or more posts, ribs, the like, or any combination thereof. The pin key member may project from a leg, knuckle, or both. The pin key member may extend radially toward a center of a knuckle.

The pin key member may fit into a slot of a pin. The pin key member and slot may form a keyed engagement ("keyed joint") where the pin key member may act as a key and the slot may act as a keyway. It may be appreciated that the spring engagement member may functionally act as a pin key member, as the spring engagement member may extend through a slot in a pin.

It may be particularly advantageous for one or more pin key members to be located on different knuckles than the spring engagement member to provide for a more positive engagement between the knuckle and pin and/or prevent torsion of the pin. A pin key member and a spring engagement member may be located at different locations along a length of a pin. A pin key member and a spring engagement member may be located proximate opposing ends of a pin.

The one or more retention members may comprise one or more knuckle indexing members. The knuckle indexing member may function to angularly position one or more legs relative to one or more other legs. The knuckle indexing members may include one or more projections, depressions, or both. The projections may extend radially from an inner circumference of a knuckle. The depressions may be formed into an inner circumference of a knuckle.

The knuckle indexing members may fit into or over complementary knuckle indexing members or pin indexing members. The knuckle indexing members may be located on a knuckle of one leg and complementary knuckle indexing members may be located on an adjacent knuckle of another leg. Where the knuckle indexing members are depressions, complementary knuckle indexing members or pin indexing members are projections and vice versa. The knuckle indexing members may have generally the same or similar profiles as complementary knuckle indexing members or pin indexing members. The knuckle indexing members may have a quadrilateral, semi-circular profile, semi-ovoid profile, semi-ellipse profile, triangular profile, the like, or any combination thereof.

It may be particularly advantageous for the profile to be semi-circular, semi-ovoid, semi-ellipse, or triangular so that the knuckle indexing members do not have to be perfectly aligned with complementary knuckle indexing members or pin indexing members to form an engagement. Even with an imperfect alignment of these profiles, the knuckle indexing members and pin indexing members may slide against each other and into alignment. The curvature and/or angle of these profiles may act as a ramp.

The knuckle indexing members may be located proximate to one of two ends of a knuckle. Complementary knuckle indexing members may project from one or two ends of a knuckle. The knuckle indexing members may be angularly spaced from one another around a circumference of a knuckle. The angular spacing may be about 10° or more, about 20° or more, about 40° or more, about 60° or more, or even about 80° or more. The angular spacing may be about 180° or less, about 160° or less, about 140° or less, about 120° or less, or even about 100° or less.

The retaining member may include a number of pin indexing members that is equal to or different from a number of knuckle indexing members. The retaining member may include at least one more pin indexing member than knuckle indexing members.

The one or more retention members may comprise one or more pins. The pin may function to hold two or more legs together, provide for rotation of two or more legs, hold two or more legs in angular position relative to one another, or any combination thereof.

The pin may be a generally elongate member. The pin may be generally linear. The pin may be generally tubular. The pin may extend through one or more knuckles. The pin may include two opposing ends. The opposing ends may be open, closed, or both. The pin may include a central cavity. The central cavity may receive at least a portion of a spring engagement member, a spring, a cap, a pin key member, or any combination thereof.

The pin may be fabricated from material that is the same as or different from legs, knuckles, or both. The pin may be fabricated from polymer, metal, wood, or any combination thereof. The polymer may include polyethylene ("PE"), polypropylene ("PP"), polyvinylchloride ("PVC"), polyamide ("PA"), polycarbonate ("PC"), Polymethylmethacrylate ("PMMA"), the like, or any combination thereof. The metal may include aluminum, magnesium, zinc, tin, brass, iron, steel, titanium, the like, or any combination thereof.

The pin may be translatable along a rotational axis of the retention member. The pin may be biased in a first direction by a spring. The pin may be biased in a second direction by a user. As referred to herein, a first and second direction are relative terms related to other structures of a retention member. Typically, a first direction may refer to a spring bias and a second direction may refer to bias of a user.

In one aspect, the pin may move relative to knuckles of both legs. In this aspect, the retaining member may include pin indexing members that form an engagement ("mate") with knuckle indexing members. Translating a pin in a second direction removes engagement of the pin indexing members and knuckle indexing members while the knuckles of each of the legs do not move relative to each other.

In another aspect, the pin may be fixed to at least one knuckle of one leg and move relative to one or more knuckles of at least one other leg. In this aspect, the retaining member may include knuckle indexing members and complementary knuckle indexing members form an engagement ("mate") with each other, each set being located on knuckles proximate to each other. Translating a pin in a second direction removes an engagement of the knuckle indexing members and complementary knuckle indexing members, while the knuckles of each of the legs move relative to each other. With the pin fixed to at least one knuckle of one leg, depression of the pin may cause one leg to displace from the other leg along the rotational axis. With the pin fixed to at least one knuckle of one leg, depression of the pin may cause at least one knuckle of one leg to traverse a spacing between it and one or more adjacent knuckles.

The pin may include one or more slots, pin indexing members, base plates, pin securing members, or any combination thereof. A cap may be secured to the pin.

The one or more pins may comprise one or more slots. The slot may function to prevent pin rotation relative to a leg, guide a pin's movement, or both. The slot may extend at least partially through a wall of a pin. The slot may extend at least partially along a length of a pin. The slot may be linear. The slot may include one or more closed ends, open ends, or both. The one or more closed ends may limit motion of a pin.

The slot may form a keyed engagement ("keyed joint") where the slot may act as a keyway and a pin key member may act as a key. The slot may be located on a knuckle and/or leg and the pin key member may be located on a pin. A cap securing member may travel through a slot to locate within a pin indexing member.

The one or more pins may comprise one or more central cavities. The central cavity may function to house one or more springs, spring engagement members, pin key members, or any combination thereof. The central cavity may extend at least partially a length of a pin. The central cavity may be accessed at one or both ends of a pin. A center of the central cavity may be coaxial with a rotational axis of a retention member. The central cavity may be in communication with a slot of a pin. A spring engagement member, pin key member, or both may traverse a length of the central cavity when a pin is biased in a first direction and/or second direction.

The one or more pins may comprise one or more pin securing members. The pin securing member may function to form a positive engagement between a cap and pin. The pin securing member may include a connector or socket. The connector may include a projection extending radially from an inner circumference and/or outer circumference of a pin. The connector may be at least partially deformable. The socket may include a void and/or depression. The void may extend through a wall of a pin. The depression may be formed partially into an inner circumference and/or outer circumference of a pin. The socket may be in communication with a slot. The slot may extend from an end of a pin at least to the socket.

The pin securing member may be located proximate to an end of a pin. The pin securing member may form an engagement with a cap securing member. For example, a pin securing member that is a socket is adapted to form an engagement with a cap securing member that is a connector. The pin securing member may form a snap lock with a cap securing member. The pin securing member may have a profile that is generally the same as or similar to a profile of a cap securing member.

The one or more pins may comprise one or more pin indexing members. The pin indexing member may function to angularly position one or more legs relative to one or more other legs. The pin indexing members may include one or more projections, depressions, or both. The projections may extend radially from an outer circumference of a pin. The depressions may be formed into an outer circumference of a pin. The pin indexing members may fit into or over knuckle indexing members. Where the pin indexing members are projections, the knuckle indexing members are depressions and vice versa.

The pin indexing members may have generally the same or similar profiles as knuckle indexing members. The pin indexing members may have a quadrilateral, semi-circular profile, semi-ovoid profile, semi-ellipse profile, triangular profile, the like, or any combination thereof. It may be particularly advantageous for the profile to be semi-circular, semi-ovoid, semi-ellipse, or even triangular so that the pin indexing members don't have to be perfectly aligned with knuckle indexing members to form an engagement. Even with an imperfect alignment of these profiles, the pin indexing members and knuckle indexing members may slide against each other and into alignment. The curvature and/or angle of these profiles may act as a ramp.

The pin indexing members may be located proximate to one of the two ends of a pin or anywhere therebetween. The pin indexing members may be angularly spaced from one another around a circumference of a pin. The angular spacing may be about 10° or more, about 20° or more, about 40° or more, about 60° or more, or even about 80° or more. The angular spacing may be about 180° or less, about 160° or less, about 140° or less, about 120° or less, or even about 100° or less. The retaining member may include a number of pin indexing members that is equal to or different from a number of knuckle indexing members. The retaining member may include at least one more pin indexing member than knuckle indexing members.

The one or more pins may comprise one or more pin base plates. The pin base plate may function to interact with a floor mat. The pin base plate may push a retention member away from a floor mat upon a user biasing a pin in a second direction.

The pin base plate may be generally planar. A profile of the pin base plate may be triangular, square, rectangular, hexagonal, the like, or any combination thereof. The pin base plate may be located at one or both ends of a pin. The pin base plate may cover and/or seal a central cavity of a pin.

The pin base plate may include one or more retention member fasteners. The retention member fastener may include a hook-and-loop-type fastener, magnets, snaps, pegs and holes, the like, or any combination thereof. The retention member fastener may at least partially cover a surface area of the pin base plate.

The retaining member may comprise one or more caps. The cap may function to retain a spring within a central cavity of a pin, load a spring, limit the movement of a pin, or any combination thereof. The cap may include a portion with dimensions matching an inner and/or outer diameter of a pin. The cap may include a generally flat portion, providing a user a surface to depress the cap and pin. A portion of the cap may extend into a central cavity and/or around an outer perimeter of a pin. A portion of the cap may cover and/or seal a central cavity of a pin. The cap may be located at one or both ends of a pin.

The cap may be fabricated from material that is the same as or different from the legs, knuckles, pin, or any combination thereof. The cap may be fabricated from polymer, metal, wood, or any combination thereof. The polymer may include polyethylene ("PE"), polypropylene ("PP"), polyvinylchloride ("PVC"), polyamide ("PA"), polycarbonate ("PC"), Polymethylmethacrylate ("PMMA"), the like, or any combination thereof. The metal may include aluminum, magnesium, zinc, tin, brass, iron, steel, titanium, the like, or any combination thereof.

The cap may include one or more cap base plates, cap securing members, plugs, or any combination thereof.

The one or more caps may comprise one or more cap base plates. The cap base plate may function to provide a user a surface to depress a cap and pin. The cap base plate may be generally planar. A profile of the cap base plate may be triangular, square, rectangular, hexagonal, the like, or any combination thereof. The cap base plate may be located on an end of a cap. The cap base plate may cover and/or seal a central cavity of a pin. The cap base plate may include a spring retaining member, heretofore described.

The one or more caps may comprise one or more plugs. The plug may form a positive engagement between a cap and pin. The plug may be generally tubular. The plug may include an outer diameter that is less than an inner diameter of a pin. In this aspect, the plug may fit into a central cavity of a pin. The plug may include an inner diameter that is greater than an outer diameter of a pin. In this aspect, the plug may fit around a circumference of a pin.

A cap base plate may be located at one end of the plug. The plug may extend generally orthogonal to a cap base plate. The plug may include a slot extending at least partially a length of the plug. The slot may align with a slot in a pin. The plug may include one or more cap securing members thereon.

The one or more caps may comprise one or more cap securing members. The cap securing member may function to form a positive engagement between a cap and pin. The cap securing member may include a connector or socket.

The connector may include a projection extending radially from an outer circumference and/or inner circumference of a plug. The connector may be at least partially deformable. The socket may include a void and/or depression. The void may extend through a stem. The depression may be formed partially into an inner circumference and/or outer circumference of a stem. The socket may be in communication with a slot. The slot may extend from an end of a cap and/or stem to the socket. The socket may be accessible, by a connector, through a slot.

The cap securing member may be located proximate to one of two opposing ends of a cap and/or stem, or anywhere therebetween. The cap securing member may form an engagement with a pin securing member. For example, a cap securing member that is a connector is adapted to form an engagement with a pin securing member that is a socket. The cap securing member may form a snap lock with a pin securing member. The cap securing member may have a profile that is generally the same as or similar to a profile of a pin securing member.

The retaining member may comprise one or more springs. The spring may function to store energy, return a pin to its original position, or both. The spring may be a helical compression spring, helical extension spring, barrel spring, torsion spring, the like, or any combination thereof. The helical extension spring may include German hooks, English hooks, or both. The hooks may connect to spring retaining members. For example, a hook may wrap around a spring retaining member in the form of a bar. The spring may be a linear rate spring, a progressive rate spring, a dual rate spring, or any combination thereof.

The spring may be housed in a central cavity of a pin. The spring may have an outer circumference that is generally equal to or less than a circumference of a central cavity of a pin. The spring may extend between an end of a pin and a spring engagement member, between a pin base plate and a spring engagement member, between a cap and a spring engagement member, or any combination thereof. A center of the spring may be coaxial with a rotational axis of a retention member. Upon depression of a cap and/or pin, by a user, the spring may be loaded. The load may be characterized by compression or extension. After releasing a cap and/or pin, by a user, the spring may release its load, causing the pin and/or cap to return to its original position. The spring may bias pin indexing members or complementary knuckle indexing members into engagement with knuckle indexing members. A user placing load on the spring may remove pin indexing members or complementary knuckle indexing members from engagement with knuckle indexing members.

The present disclosure provides for a method for securing articles while being transported in a vehicle. The method may comprise one or more of the following steps. Some of the steps may be duplicated, removed, or eliminated, rearranged relative to other steps, combined into one or more steps, separated into two or more steps, or a combination thereof.

The method may comprise providing a retention member including at least a first and second leg joined along a rotational axis, depressing a pin linearly along the rotational axis in a first direction, positioning the at least first and second leg in an angular position relative to each other, and releasing the pin to enable the pin to translate along the rotational axis in a second direction. The angular position may be about 30° or more, about 60° or more, about 90° or more, about 120° or more, about 150° or more, or even about 180° or more. The angular position may be about 330° or less, about 300° or less, about 270° or less, about 240° or less, or even about 210° or less. The method may further include a step of positioning the retention member on a floor mat. The method may further include a step of depressing the pin causing the pin to push the at least first and second leg away from the floor mat.

Figure 2:
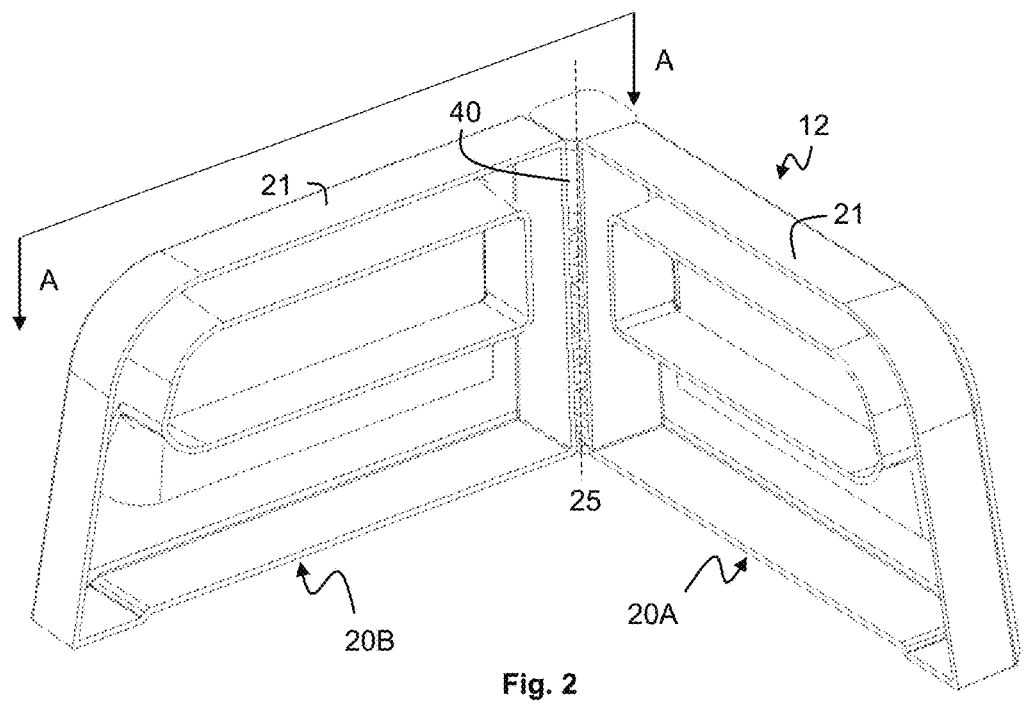
FIG. 2 is a perspective view of a retention member.

FIG. 1 and FIG. 2 are perspective views of a retention member 12. The retention member 12 comprises a first leg 20A and a second leg 20B, which are rotatably or pivotably connected to each other along a rotational or pivot axis 25 of the retention member 12 and oriented at 90° relative to each other. The legs 20A, 20B include floor mat engaging surfaces 22 on one edge, illustrated in FIG. 1. The floor mat engaging surfaces 22 include a hook-type fastener 70 adapted to interact with a loop-type fastener 72 of a floor mat 11, illustrated in FIG. 8. Each of the legs 20A, 20B include a handle 21 integrally formed thereon to assist users manipulate the retention member 12.

Each of the legs 20A, 20B include knuckles 24 coupled to the edges of each of the legs 20A, 20B, in a staggered arrangement, with a space therebetween to enable the knuckles 24 coupled to the first leg 20A to stack with the knuckles 24 coupled to the second leg 20B. A center of the stacked knuckles 24 are coaxial with the rotational axis 25. The knuckles 24 are open-ended tubes coupled to the edges of the legs 20A, 20B. The retention member 12 includes a pin 40 extending through the knuckles 24, a center of the pin 40 being coaxial with the rotational axis 25.

Figure 3:
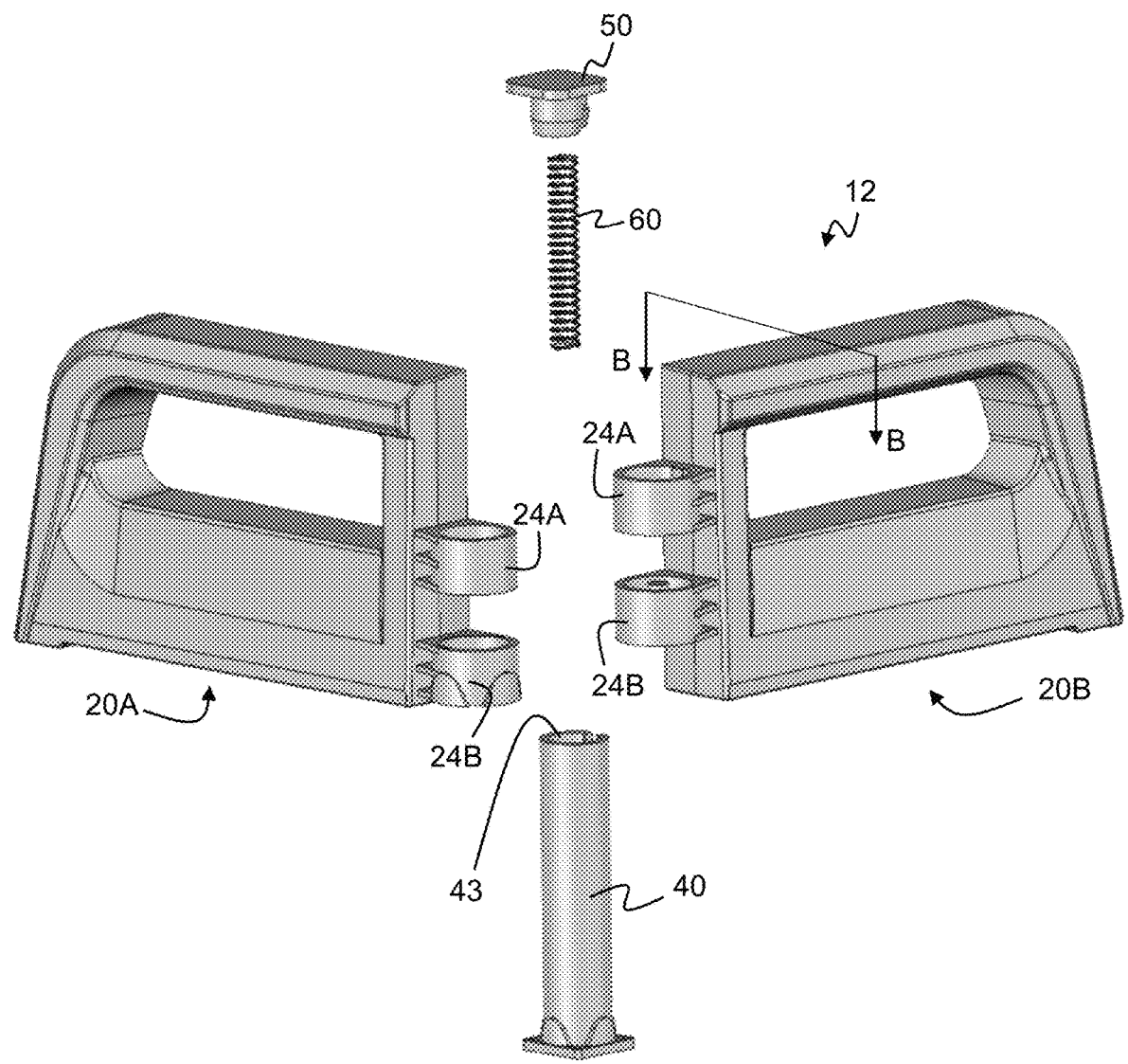
FIG. 3 is an exploded view of a retention member.

FIG. 3 is an exploded view of a retention member 12. The retention member 12 comprises a first leg 20A and a second leg 20B. Knuckles 24A, 24B are coupled to edges of each of the legs 20A, 20B. The knuckles 24A, 24B are staggered, with a space therebetween to enable the knuckles 24A, 24B coupled to the first leg 20A to stack with the knuckles 24A, 24B coupled to the second leg 20B. The knuckles 24A, 24B are open-ended tubes. The retention member 12 includes a pin 40 that extends through the knuckles 24A, 24B. The pin 40 includes a central cavity 43, which receives a spring 60. The pin 40 receives a cap 50, which seals the spring 60 within the central cavity 43.

Figure 4:
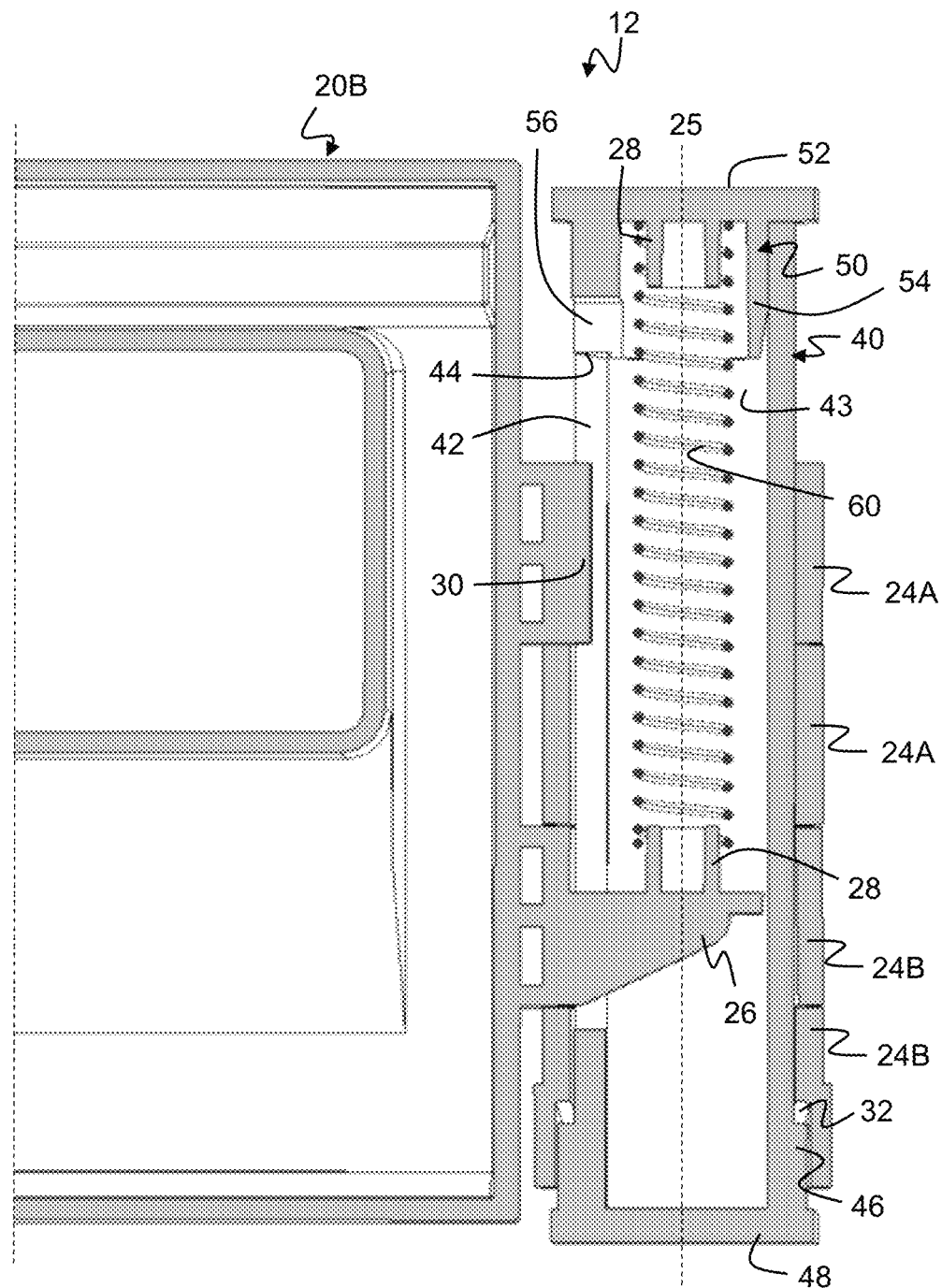
FIG. 4 is a cross-sectional view of the retention member of FIG. 2, taken along line A-A.

FIG. 4 is a cross-sectional view of the retention member 12 illustrated in FIG. 2, the cross-section taken along line A-A. The retention member 12 includes a first leg 20A and a second leg 20B. Each of the legs 20A, 20B include two knuckles 24A, 24B stacked coaxially with a rotational axis 25 of the retention member 12.

A pin 40 extends through the knuckles 24A, 24B coupled to each of the legs 20A, 20B. An end of the pin 40 includes a pin base plate 48, preventing removal of the pin 40 in one direction, and an opposing end of the pin 40 receives a cap 50, preventing removal of the pin 40 in the other direction. The cap 50 includes a plug 54, cap base plate 52, cap securing member 56, and spring retaining member 28. The plug 54 extends into and is friction fit with the central cavity 43 of the pin 40. The cap base plate 52 seals the end of the pin 40 and prevents removal of the pin 40. A spring retaining member 28 extends orthogonally from the base plate 52. The pin 40 includes a pin securing member 44 and the cap 50 includes a cap securing member 56. Introduction of the cap 50 into the pin 40, with the pin securing member 44 and cap securing member 56 aligned, causes a snap-fit engagement of the same.

The knuckle 24B of the leg 20B includes a spring engagement member 26 extending cantilever therefrom. A spring retaining member 28 extends orthogonally from the spring engagement member 26. The spring retaining member 28 of the cap 50 and the spring retaining member 28 of the spring engagement member 26 are aligned along the rotational axis 25 of the retention member 12.

A spring 60 is located within the central cavity 43 between the cap base plate 52 and the spring engagement member 26. The spring 60 can be introduced into the central cavity 43 and then the cap 50 can seal the central cavity 43. The spring 60 fits over the spring retaining member 28 of the cap 50 and the spring retaining member 28 of the spring engagement member 26. The spring retaining members 28 prevent shifting or buckling of the spring 60 within the central cavity 43. Depression of the cap 50 toward the spring engagement member 26 loads the spring 60 and upon release of the cap 50, the spring 60 releases said load to cause the cap 50 to move away from the spring engagement member 26.

The pin 40 includes a slot 42 extending linearly and at least partially along a length of the pin 40. The knuckle 24A coupled to the leg 20B includes a pin key member 30 projecting radially toward a center of the knuckle 24A. The pin key member 30 extends into the slot 42 of the pin 40, preventing rotation of the pin 40 relative to the leg 20B. During depression and release of the cap 50, the pin 40 travels linearly along the pin key member 30.

The knuckle 24B coupled to the leg 20A, illustrated in FIG. 2, includes knuckle indexing members 32 distributed around the inner circumference of the knuckle 24B. The pin 40 includes pin indexing members 46 distributed around the outer circumference of the pin 40. The pin indexing members 46 selectively disengage with the knuckle indexing members 32 when the cap 50 is depressed toward the spring engagement member 26. Rotation of the legs 20A, 20B, relative to each other, is enabled when the pin indexing members 46 are fully removed from engagement with the knuckle indexing members 32. The pin indexing members 46 selectively engage with the knuckle indexing members 32 when the cap 50 is released and the spring 60 biases the cap 50 away from the spring engagement member 26.

Figure 5:
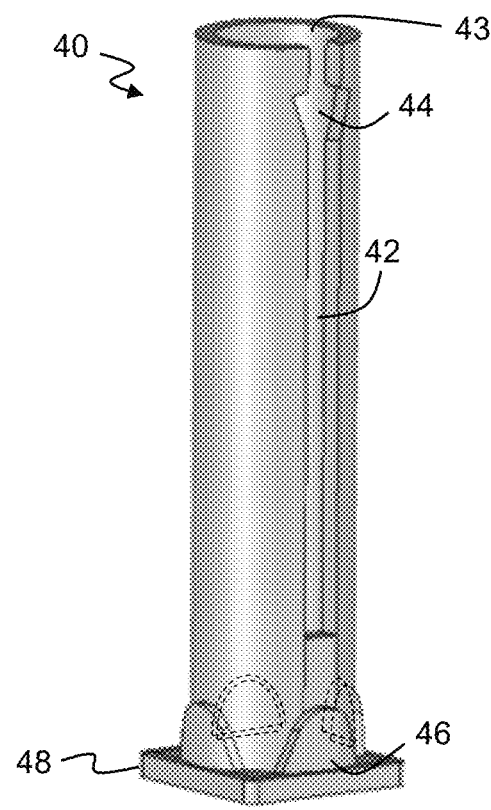
FIG. 5 is a perspective view of a pin.

FIG. 5 is a perspective view of a pin 40. The pin 40 is an elongate tube having an open end and a closed end. A pin base plate 48 is situated on an end of the pin 40 opposing the open end. A central cavity 43 extends from the base plate 48 to the opposing open end. The pin 40 includes a slot 42 extending linearly from the open end and partially along a length of the pin 40, terminating proximal to pin indexing members 46. The slot 42 provides passage into the central cavity 43. The pin 40 includes a pin securing member 44 proximal to the open end. A cap 50, illustrated in FIG. 6, engages with the open end and the pin securing member 44 forms a snap fit with a cap securing member 56 of the cap 50. Four pin indexing members 46 are situated around a circumference of the pin 40, adjacent to the base plate 48. The pin indexing members 46 are parabolically shaped projections extending radially from the pin 40. The pin indexing members 46 are angularly spaced 90° from one another.

Figure 6:
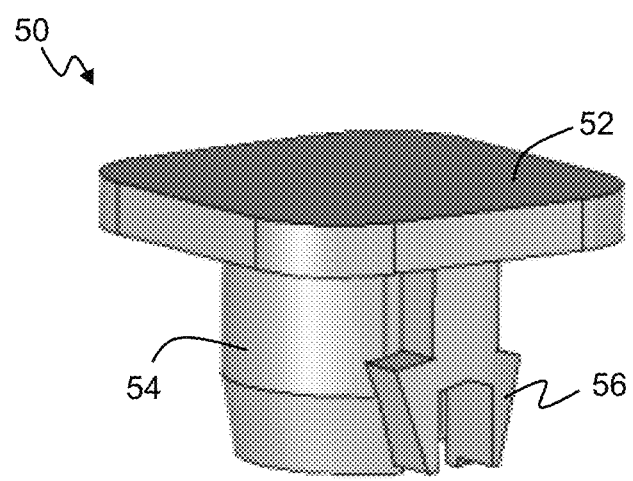
FIG. 6 is a perspective view of a cap.

FIG. 6 is a perspective view of a cap 50. The cap 50 comprises a cap base plate 52, a plug 54, and a cap securing member 56. The plug 54 is adapted to be received in the central cavity 43 of the pin 40, illustrated in FIG. 5. The cap securing member 56 forms a snap-fit with the pin securing member 44 of the pin 40, illustrated in FIG. 5.

Figure 7:
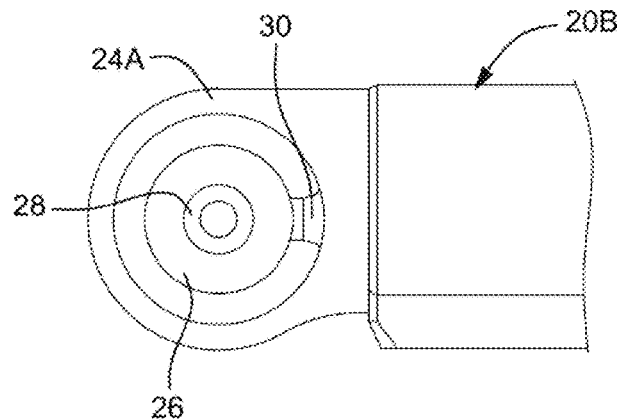
FIG. 7 illustrates the leg of FIG. 3, viewed along lines B-B.

FIG. 7 illustrates the leg 20B of FIG. 3, viewed along lines B-B. The leg 20B includes two knuckles 24A, 24B, illustrated in FIG. 3. Just the top-most knuckle 24A is visible in FIG. 7. A spring engagement member 26 extends cantilever from the knuckle 24B. The spring engagement member 26 includes a spring retaining member 28 integrally formed thereon. The spring retaining member 28 is a tubular projection extending orthogonal to the spring engagement member 26. The center of the spring retaining member 28 is coaxial with the rotational axis 25 of the retention member 12, illustrated in FIG. 3. The spring engagement member 26 is adapted to fit within the slot 42 and central cavity 43 of the pin 40, illustrated in FIG. 5.

The knuckle 24A includes a pin key member 30 extending radially toward a center of the knuckle 24A. The pin key member 30 fits into the slot 42 of the pin 40, illustrated in FIG. 5. Both the spring engagement member 26 and the pin key member 30 prevent rotation of the pin 40 relative to the leg 20B.

Figure 8:
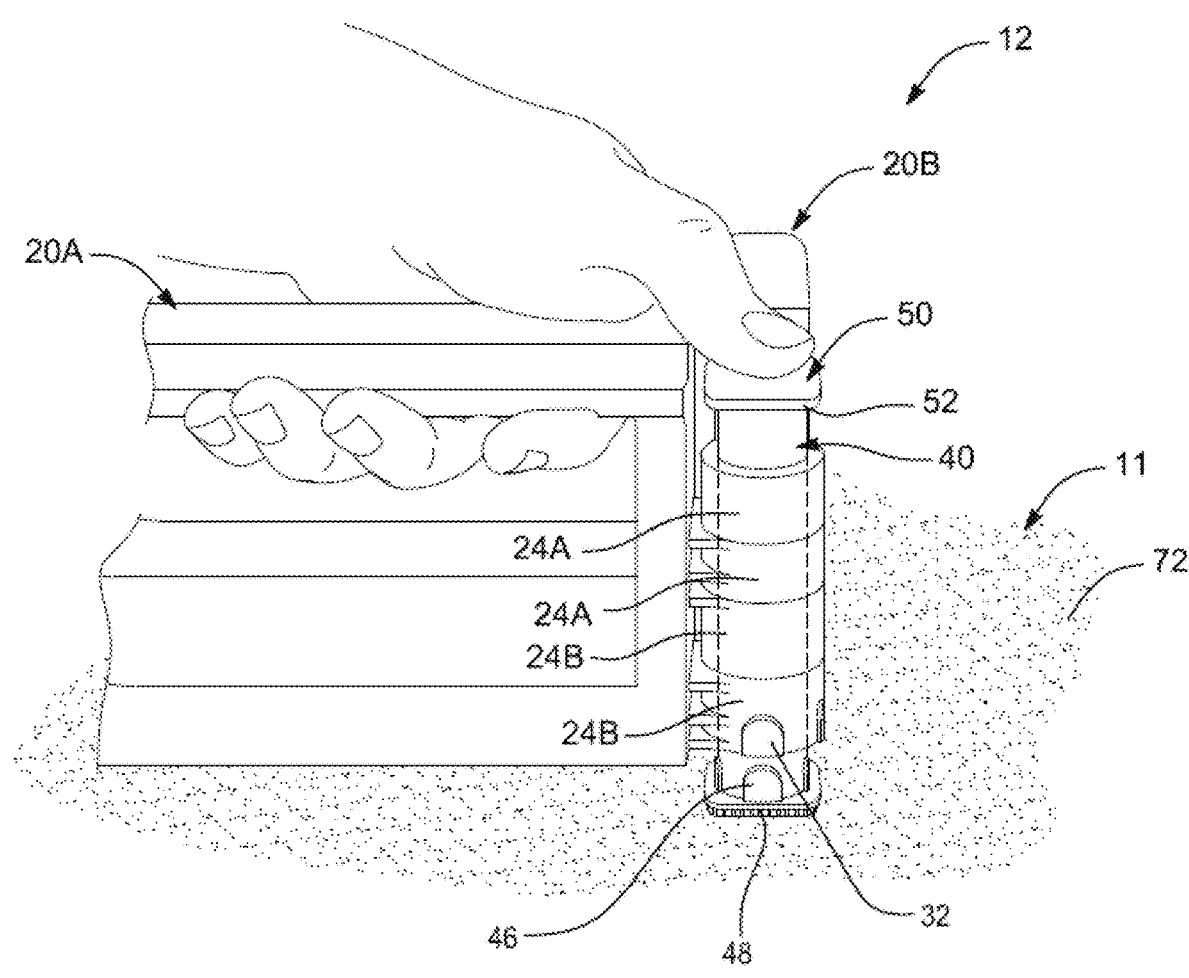
FIG. 8 is a perspective view of a retention member.

FIG. 8 is a perspective view of a retention member 12. The retention member 12 comprises floor mat engaging surfaces 22 with hook-type fasteners 70 located thereon, illustrated in FIG. 1. The floor mat engaging surfaces 22 interface with a floor mat 11, the floor mat 11 including loop-type fasteners 72.

The retention member 12 comprises a first leg 20A and a second leg 20B. The legs 20A, 20B each comprise knuckles 24A, 24B. The knuckle 24B coupled to the first leg 20A includes knuckle indexing members 32, which selectively engage with pin indexing members 46 located on a pin 40. The retention member 12 further comprises a pin 40 and a cap 50. The pin 40 includes a pin base plate 48, which engages the floor mat 11. The cap 50 includes a cap base plate 52, which provides a surface for a user to actuate the pin 40.

The pin indexing members 46 selectively disengage from the knuckle indexing members 32 when the cap 50 is depressed. In the same motion, the pin base plate 48 pushes the retention member 12 away from the floor mat 11, assisting the user release the hook-type fasteners 70 from the loop-type fasteners 72. The pin indexing members 46 selectively engage with the knuckle indexing members 32 when the cap 50 is released.

Figure 9:
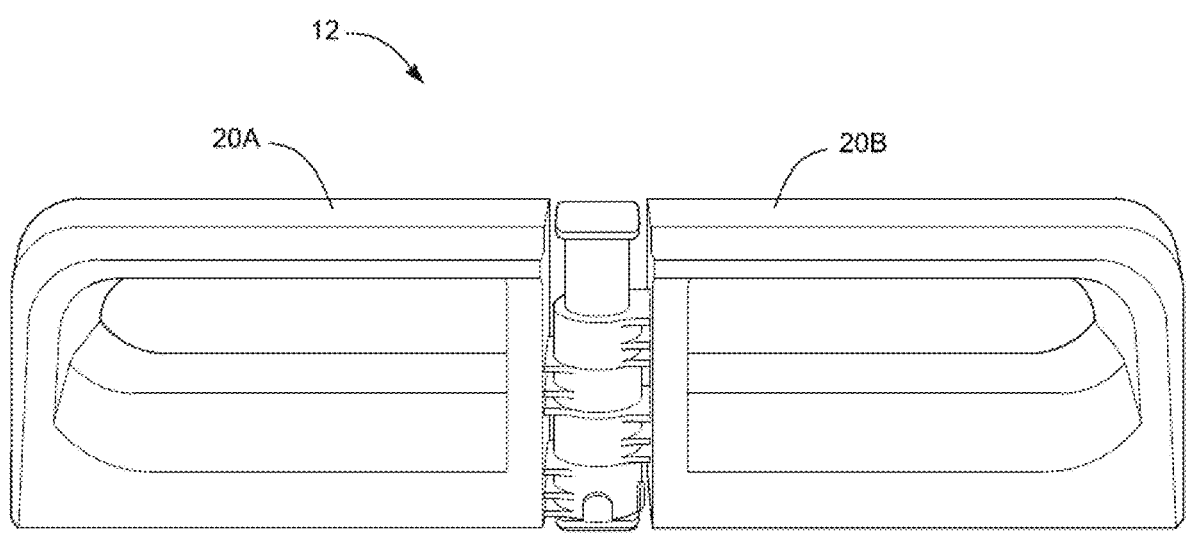
FIG. 9 is a perspective view of a retention member.

FIG. 9 is a perspective view of a retention member 12. The legs 20A, 20B of the retention member 12 are oriented at 180° relative to each other. The legs 20A, 20B can be selectively oriented at 180° or 90°, illustrated in FIG. 1 and FIG. 2, by disengaging pin indexing members 46 from knuckle indexing members 32, illustrated in FIG. 8, and angularly manipulating the legs 20A, 20B.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use. Other combinations are also possible as will be gleaned from the following claims, which are also hereby incorporated by reference into this written description.

Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The disclosures of all articles and references, including patent applications and publications, are incorporated by reference in their entirety for all purposes.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers, and/or sections, these elements, components, regions, layers, and/or sections should not be limited by these terms. These terms may be used to distinguish one element, component, region, layer, or section from another region, layer, or section. Terms such as "first," "second," and other numerical terms when used herein do not imply a sequence or order unless clearly indicated by the context. Thus, a first element, component, region, layer, or section could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to one or more other elements or features as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

REFERENCE NUMERALS

10 Cargo hold system
11 Floor mat
12 Retention member
20A Leg
20B Leg
21 Handle
22 Floor mat engaging surface
24A Knuckle
24B Knuckle
25 Rotational axis
26 Spring engagement member
28 Spring retaining member
30 Pin key member
32 Knuckle indexing member
40 Pin
42 Slot
43 Central cavity
44 Pin securing member
46 Pin indexing member
48 Pin base plate
50 Cap
52 Cap base plate
54 Plug
56 Cap securing member
60 Spring
70 Retention member fastener
72 Floor mat fastener

What is claimed is:

1. A retention member for securing articles while being transported in a vehicle, the retention member comprising:
   at least a first and second leg, each of which including at least one knuckle aligned coaxially with a rotational axis of the retention member, the at least one knuckle of the first leg and the at least one knuckle of the second leg cooperating with one another to form a hinge,
   a pin linearly translatable along the rotational axis, and
   a spring biasing the pin in a first direction;
   wherein translating the pin in a second direction enables the at least two legs to rotate relative to each other, and
   wherein the pin extends outward from one end of the hinge in the first direction and outward from an opposite end of the hinge in the second direction.

2. The retention member according to claim 1, wherein the spring biases at least one pin indexing member on the pin into engagement with at least one knuckle indexing member on the at least one knuckle of the first leg.

3. The retention member according to claim 2, wherein translating the pin in the second direction removes the at least one pin indexing member from engagement with the at least one knuckle indexing member.

4. The retention member according to claim 2, wherein the pin includes at least two pin indexing members angularly spaced from one another around a circumference of the pin; and
   wherein the at least one knuckle indexing member is rotatably positioned to selectively engage with any of the at least two pin indexing members.

5. The retention member according to claim 4, wherein the at least two pin indexing members have an angular spacing of about 90° from one another.

6. The retention member according to claim 2, wherein the at least one pin indexing member and the at least one knuckle indexing member have a semi-circular profile, semi-ovoid profile, semi-ellipse profile, triangular profile, or any combination thereof.

7. The retention member according to claim 5, wherein the at least first and second leg can be selectively angularly positioned 90°, 180°, or 270° relative to each other.

8. The retention member according to claim 1, wherein the second leg is rotatably static relative to the pin whereas the first leg rotatably translates relative to the pin.

9. A retention member for securing articles while being transported in a vehicle, the retention member comprising:
  at least a first and second leg, each of which including at least one knuckle aligned coaxially with a rotational axis of the retention member;
  a pin linearly translatable along the rotational axis; and
  a spring biasing the pin in a first direction,
  wherein translating the pin in a second direction enables the at least two legs to rotate relative to each other,
  wherein the second leg is rotatably static relative to the pin whereas the first leg rotatably translates relative to the pin, and
  wherein the at least one knuckle of the second leg includes a spring engagement member extending cantilever from the at least one knuckle.

10. The retention member according to claim 9, wherein the pin includes a slot extending linearly and at least partially along a length of the pin; and
  wherein the spring engagement member extends through the slot.

11. The retention member according to claim 10, wherein the pin includes a central cavity into which the spring engagement member at least partially extends; and
  wherein the central cavity houses the spring, which engages the spring engagement member.

12. A cargo hold system for securing articles while being transported in a vehicle, the cargo hold system comprising:
  a retention member including:
    at least a first and second leg, each of which including at least one knuckle aligned coaxially with a rotational axis of the retention member,
    a pin linearly translatable along the rotational axis, and
    a spring biasing the pin in a first direction; and
  a floor mat; and
  wherein the retention member removably fastens to the floor mat.

13. The cargo hold system according to claim 12, wherein the retention member includes one or more floor mat engaging surfaces, the one or more floor mating engaging surfaces including a retention member fastener.

14. The cargo hold system according to claim 13, wherein the floor mat includes a floor mat fastener.

15. The cargo hold system according to claim 14, wherein the retention member fastener is a hook-type fastener and the floor mat fastener is a loop-type fastener, or vice versa.

16. The cargo hold system according to claim 12, wherein translating the pin in a second direction causes the pin to push the at least first and second leg away from the floor mat.

* * * * *